United States Patent [19]

Hayashi

[11] Patent Number: 5,124,964
[45] Date of Patent: Jun. 23, 1992

[54] FOCUS SERVO GAIN SETTING CIRCUIT FOR OPTICAL RECORD DISC REPRODUCING APPARATUS

[75] Inventor: Yasuhiro Hayashi, Yokohama, Japan

[73] Assignee: Kabushiki Kaisha Toshiba, Kanagawa, Japan

[21] Appl. No.: 633,170

[22] Filed: Dec. 28, 1990

Related U.S. Application Data

[63] Continuation of Ser. No. 437,309, Nov. 17, 1989, abandoned, which is a continuation of Ser. No. 80,663, Aug. 3, 1987, abandoned.

[30] Foreign Application Priority Data

Aug. 12, 1986 [JP] Japan .................. 61-189007

[51] Int. Cl.⁵ .................. G11B 7/00; G11B 21/10
[52] U.S. Cl. .................. 369/44.11
[58] Field of Search .................. 369/44, 45, 46, 48, 369/44.11, 44.25

[56] References Cited

U.S. PATENT DOCUMENTS 4,484,319  11/1984  Koishi et al. .................. 369/46
4,507,765  3/1985  Suzuki et al. .................. 369/45
4,689,779  8/1987  Hayashi et al. .................. 369/44

Primary Examiner—William L. Sikes
Assistant Examiner—Robert E. Wise
Attorney, Agent, or Firm—Finnegan, Henderson, Farabow, Garrett and Dunner

[57] ABSTRACT

A focus servo gain setting circuit for an optical record disc reproducing apparatus. The focus servo gain setting circuit includes a gain controllable amplifier, a laser light beam source, a lens drive circuit for generating a lens drive signal having a predetermined polarity, and an optical pickup for detecting data stored on the disc and generating data signals corresponding thereto. The optical pickup includes a lens which is movable in response to the lens drive signal and has a prescribed focal point and a focus circuit for generating focus error pulse signals in response to the movement of the focal point. The circuit further includes a circuit for adjusting the gain of the amplifier in response to receipt of each of a predetermined plurality of focus error pulse signals and a circuit responsive to the optical pickup for reversing the polarity of the lens drive signal for increasing the output rate of the focus error pulse signals.

10 Claims, 6 Drawing Sheets

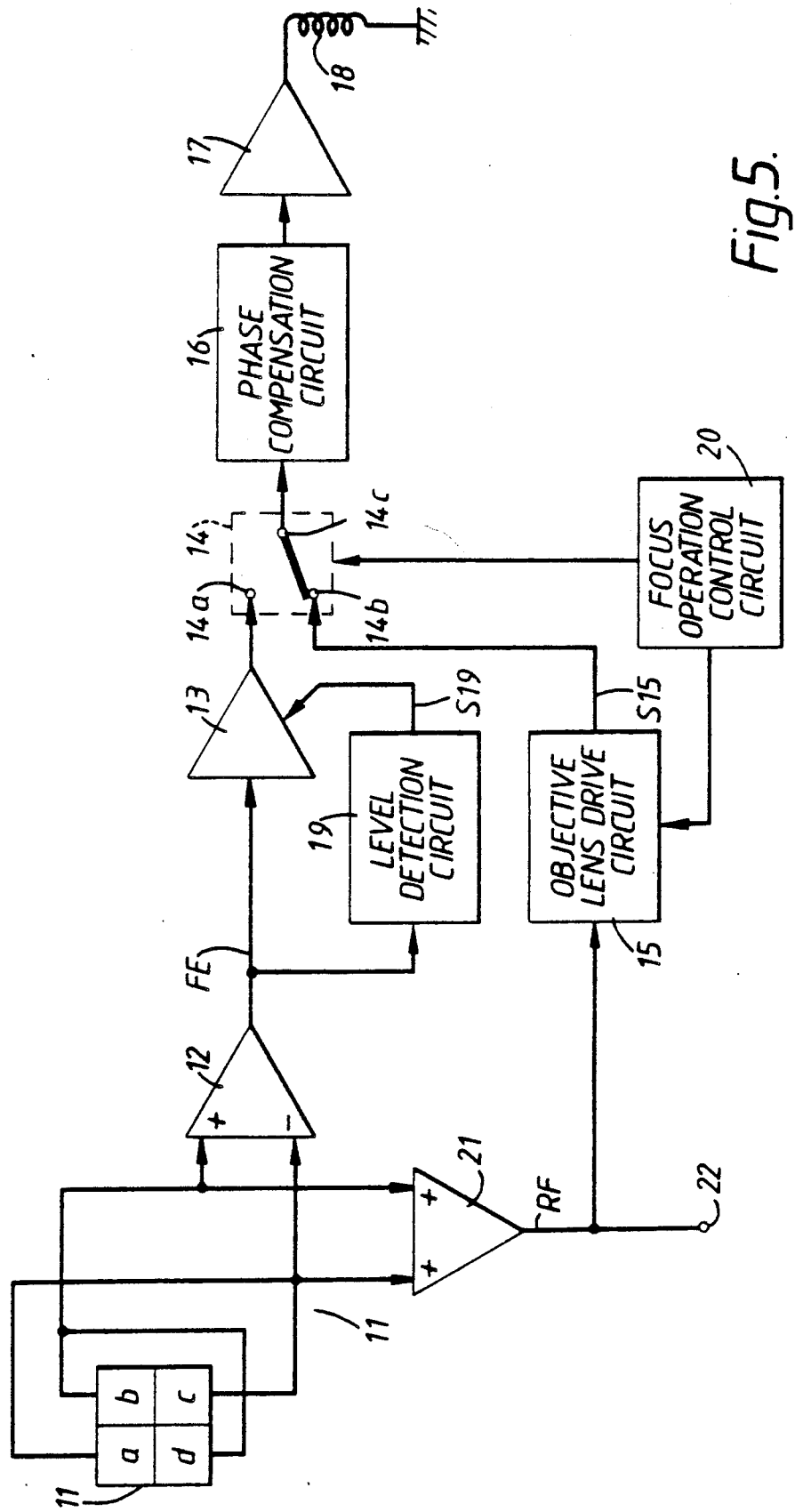

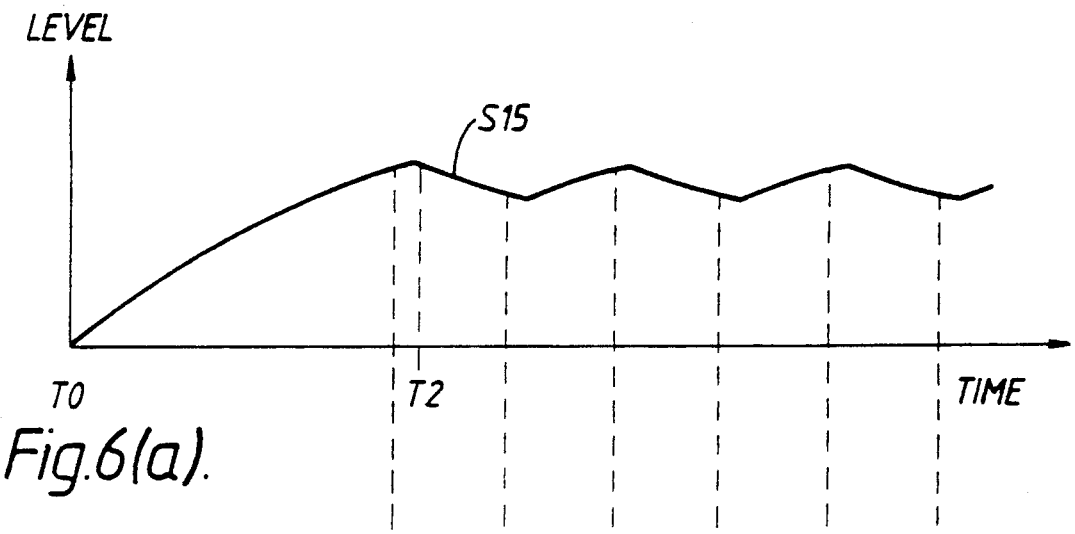
Fig.6(a).
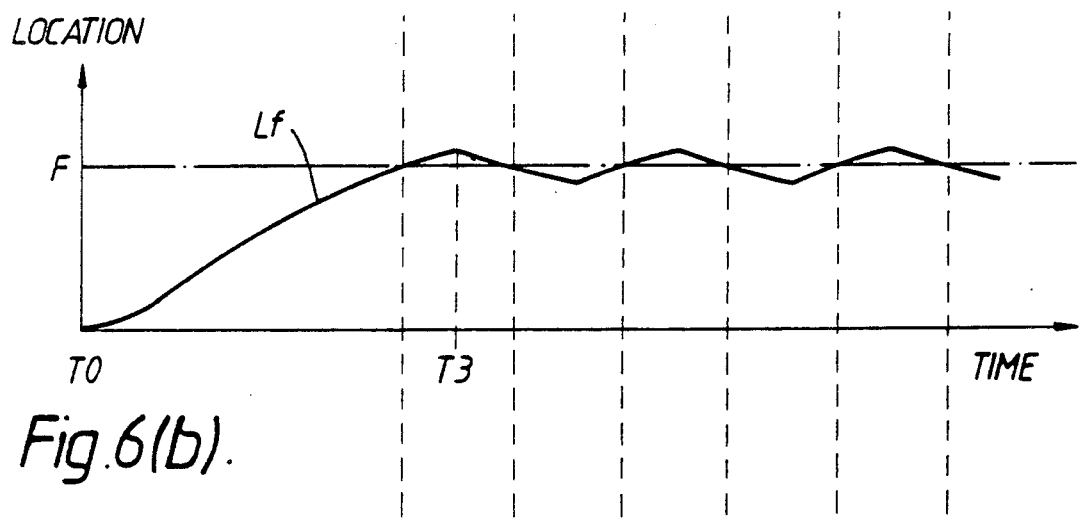
Fig.6(b).
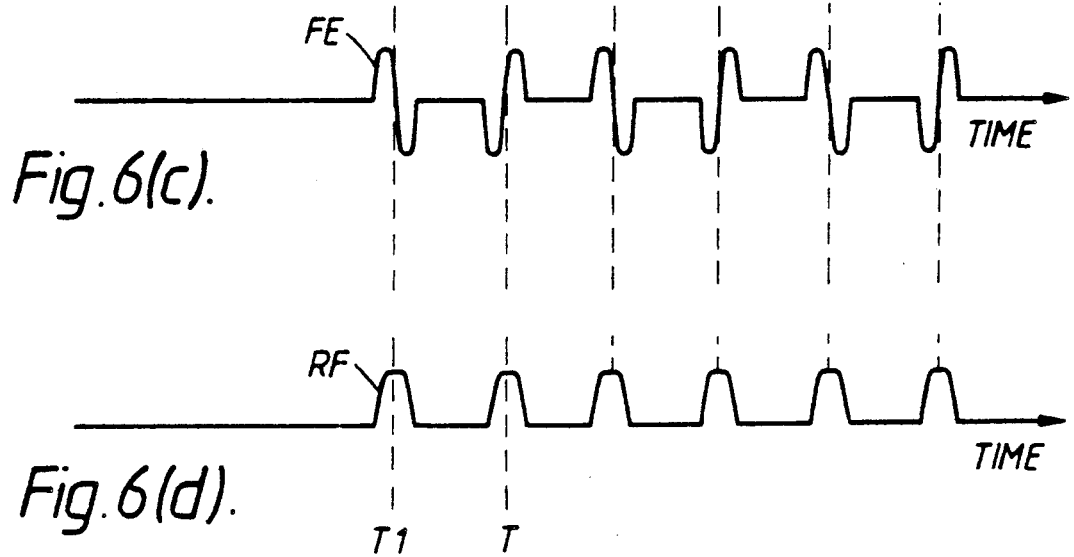
Fig.6(c).
Fig.6(d).

FOCUS SERVO GAIN SETTING CIRCUIT FOR OPTICAL RECORD DISC REPRODUCING APPARATUS

This application is a continuation of application Ser. No. 07/437,309, filed Nov. 17, 1989, now abandoned, which is a continuation application of application Ser. No. 07/080,663, filed Aug. 3, 1987, now abandoned.

FIELD OF THE INVENTION

The present invention relates generally to an optical record disc reproducing apparatus, and more particularly, to focus servo gain setting circuits for an optical record disc reproducing apparatus of a type that align a beam of light relative to a selected one of a plurality of parallel recording tracks on an optical record disc.

BACKGROUND OF THE INVENTION

In an optical record disc of the type presently used with a DAD (Digital Audio Disc player or a video disc player, audio or video information is recorded in optically coded form as a series of recesses or pits formed in the information carrying face of the optical record disc and is arranged in either a single spiral track or a plurality of concentric tracks about the center axis of the optical record disc. The audio or video information thus recorded is reproduced by optically scanning the individual recesses or pits along the spiral track or the concentric tracks by means of a convergent spot of a laser light beam developed from a laser light source. The laser light beam is utilized to detect the lengths and spacings between the scanned recesses or pits. During reproduction, the optical record disc is usually rotated about the center axis thereof at a constant linear velocity (CLV) or a constant angular velocity (CAV), and the convergent spot of the laser light beam is displaced perpendicularly and radially relative to the optical record disc by a focusing device and a tracking device of a pick-up unit. These elements are components of a DAD or video disc player, and are controlled by a focusing servo and a tracking servo, respectively. The laser beam is applied to a selected track location and is either reflected by the information carrying face of the optical record disc or passed through the optical record disc. The beam of light thus reflected by or passed through the optical record disc is then converted into an electrical signal by means of a photoelectric transducer mounted on the pick-up unit, so as to facilitate further conversion into an audio or video signal.

In order to reproduce the information recorded on the optical record disc, the convergent spot of the laser light beam must be precisely focused on the information carrying face of the optical record disc and applied to a selected track location on the information carrying face. To this end, it is known to employ a method in optical record disc information reproducing apparatus wherein light beams, exclusively used for scanning, i.e., for focusing and tracking, are generated separately from the light beam used for reproducing the audio or video information signal. A photoelectric transducer is used for detecting the scanning light beam and effecting scanning control. Another known method involves extracting both the audio or video information signal and the scanning signal with a single light beam.

According to these methods, the light beam for the scanning servo is reflected by the optical record disc and introduced into a photoelectric transducer. The light beam thus reflected is converted into a focusing error information signal and a tracking error information signal. The focusing error information signal is introduced into a focusing actuator for driving an objective lens mounted on the pick-up unit perpendicularly relative to the optical record disc, so as to accurately apply the convergent spot to the information carrying face. The focusing actuator comprises the focusing servo for the convergent spot of the laser light beam.

The focusing servo must have relatively high response characteristics to enable the convergent spot to accurately follow quick fluctuations of the information carrying face which are typical during reproduction conditions. Generally, the gain of the focus servo system is adjusted for adequate response characteristics using the focusing error information signal, which is obtained in a focus search operation performed prior to the disc reproducing operation. That is, at a start of the disc reproducing operation, an objective lens is driven to a position roughly corresponding to the focusing condition by focus search means. Then, the objective lens is kept in a correct focus position by a focus servo means. The focusing error information signal for adjusting the focus servo gain is obtained in the focus search operation at the start of the disc reproducing operation.

FIG. 1 shows an example of conventional focus servo gain setting circuits for an optical record disc reproducing apparatus. In FIG. 1, parts which are not relevant to the control of the apparatus are omitted from the illustration. Optical pickup 11, which is conventional, comprises four photoelectric transducing elements 11a, 11b, 11c and 11d arranged diagonally to each other for separately detecting a reflected light beam, and a circuit for processing signals detected therefrom. The optical pickup 11 generates three signals, an audio or video information carrying signal, i.e., so-called an RF (Radio Frequency; a very high frequency) signal, a tracking information carrying signal, i.e., a tracking error signal, and a focusing information carrying error signal, i.e., a focusing error signal, through the processing circuits. However, for simplicity of operation, only a circuit 12 for generating the focusing error signal FE is shown in FIG. 1. The processing circuit 12 for the focusing error signal FE is constituted by a subtraction circuit.

Signals detected by two photoelectric transducing elements, e.g., 11a and 11c corresponding diagonally to each other are applied to an inversed phase input of the subtraction circuit 12. Other signals detected by two other photoelectric transducing elements, e.g., 11b and 11d corresponding diagonally to each other are applied to a non-inversed phase input of the subtraction circuit 12. Thus, the subtraction circuit 12 produces the focusing error signal FE. The focusing error signal FE is applied through a gain controllable amplifier 18 to a first input terminal 14a of a selector switch 14. The focusing error signal FE is further applied to a level detection circuit 19. The level detection circuit 19 detects the level of the focusing error signal FE and applies its output, i.e., a level detection signal S19 to a control terminal of the gain controllable amplifier 13. Thus, the gain of the gain controllable amplifier 13 is controlled in accordance with the level of the focusing error signal FE. As a result, the focus servo gain of the focus servo system is automatically adjusted.

A second input terminal 14b of the selector switch 14 is coupled to an objective lens drive circuit 15. The objective lens drive circuit 15 for the gain setting operation and the selector switch 14 are coupled to a focus operation control circuit 20. An output terminal 14c of the selector switch 14 is coupled to a focus actuator 18, which is provided for moving an objective lens not shown) in the direction perpendicular to an information carrying face of a disc, through a phase compensation circuit 16 and a drive amplifier 17. In the Figure, the focus actuator 18 is represented by a focus actuator coil.

Referring now to FIGS. 2(a), 2(b) and 2(c), the operation of the conventional focus servo gain setting circuits for an optical record disc reproducing apparatus shown in FIG. 1 will be described. The focus operation control circuit 20 controls the selector switch 14 to select the second input terminal 14b, when a disc reproducing operation is requested. The focus operation control circuit 20 further controls the objective lens drive circuit 15, so that the circuit 15 generates a lens drive signal S15. The lens drive signal S15 alternates at a period Of about 0.5–1.0 sec., so that the signal S15 has a triangular waveform, as shown by waveform S15 in FIG. 2(a). The lens drive signal S15 is applied to the focus actuator coil 18 through the selector switch 14, the phase compensating circuit 16 and the drive amplifier 17. The focus actuator coil 18 actuates the objective lens to move perpendicularly relative to the information carrying face of the optical record disc. As a result, a location Lf of the focal point of the light beam varies in response to the lens drive signal S15. A graph Lf in FIG. 2(b) shows the variation of the location Lf of the focal point. In FIG. 2(b), a line F shows the location of the information carrying face. When the location Lf of the focal point moves across the location F of the information carrying face, the optical pickup 11 generates the focusing error signal FE, as shown by a graph FE in FIG. 2(c).

The level of the focusing error signal FE is detected by the level detection circuit 19 each time the focal point moves across the location F of the information carrying face. The output of the level detection circuit 19, i.e., the level detection signal S19 responsive to the focusing error signal FE is applied to the gain controllable amplifier 13, so that the gain of the gain controllable amplifier 13 is set to an adequate level. The gain setting of the gain controllable amplifier 13 is completed through several applications, e.g., six times or more, of the level detection signal S19. The focus operation control circuit 20 or any other conventional circuit, e.g., a microcomputer, counts the applications of the level detection signal S19.

After completion of the gain setting, a focus search operation is performed in a conventional manner. After the focus search operation, the focus operation control circuit 20 controls the selector switch 14 to select the first input terminal 14a. As a result, the focusing error signal FE is applied to the focus actuator coil 18, in place of the lens drive signal S15 from the objective lens drive circuit 15. After that, the objective lens is controlled by the focusing error signal FE, so that the focus servo for the objective lens is controlled according to the focus servo gain previously set.

However, the conventional focus servo gain setting circuit for an optical record disc reproducing apparatus, as shown in FIG. 1, has a drawback in that it takes a long time for the gain setting operation.

In particular, as described above, the gain setting of the gain controllable amplifier 13 is completed through several applications, e.g., six times or more of the level detection signals S19. The focusing error signal FE is generated only twice in every cycle of the oscillatory movement of the objective lens during the gain setting operation. On the other hand, the oscillatory movement of the objective lens has a relatively long cycle, e.g., 0.5–1.0 sec., as mentioned before. Thus, the gain setting of the gain controllable amplifier 13 takes a considerably long time, e.g., about 1.5 sec. or more.

It should be apparent to those knowledgeable in the field of scanning beam control systems, and particularly the field of scanning beam tracking systems, that there is a need for a system that can detect and compensate for deviations from normal operation of the specified characteristic being controlled. In particular, it should be apparent from the foregoing that a need exists for a focusing system that includes means for detecting and compensating for record medium defects that otherwise can cause a loss of focusing. The present invention fulfills this need.

SUMMARY OF THE INVENTION

It is, therefore, an object of the present invention to provide a focus servo gain setting circuit for an optical record disc reproducing apparatus in which a gain setting operation is performed in a relatively short time.

In order to achieve the above object, a focus servo gain setting circuit according to one aspect of the present invention for an optical record disc reproducing apparatus in which information data stored in an optical disc as a series of recesses or pits arranged in concentric tracks or in a single spiral track is read out during rotation of the optical record disc by a scanning spot of a laser light beam, includes a gain controllable amplifier, a laser light beam source, a lens drive circuit for generating a lens drive signal having a predetermined polarity, an optical pickup for detecting data stored on the disc and generating data signals corresponding thereto, the optical pickup including a lens which is movable in response to the lens drive signal and has a prescribed focal point and a focus circuit for generating focus error pulse signals in response to the movement of the focal point, a circuit for adjusting the gain of the amplifier in response to receipt of each of a predetermined plurality of the focus error pulse signals, and a circuit responsive to the optical pickup means for reversing the polarity of the lens drive signal for increasing the speed of the focus error pulse signals.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

FIG. 5 is a block diagram of a second preferred embodiment of a focus servo gain setting circuit for an optical record disc reproducing apparatus according to the present invention; and FIGS. 6(a), 6(b), 6(c) and 6(d) are timing diagrams showing various waveforms appearing in the circuit arrangement of FIG. 5, and the relative position of the optical focal point.

DESCRIPTION OF THE PREFERRED EMBODIMENTS

Figure 1:
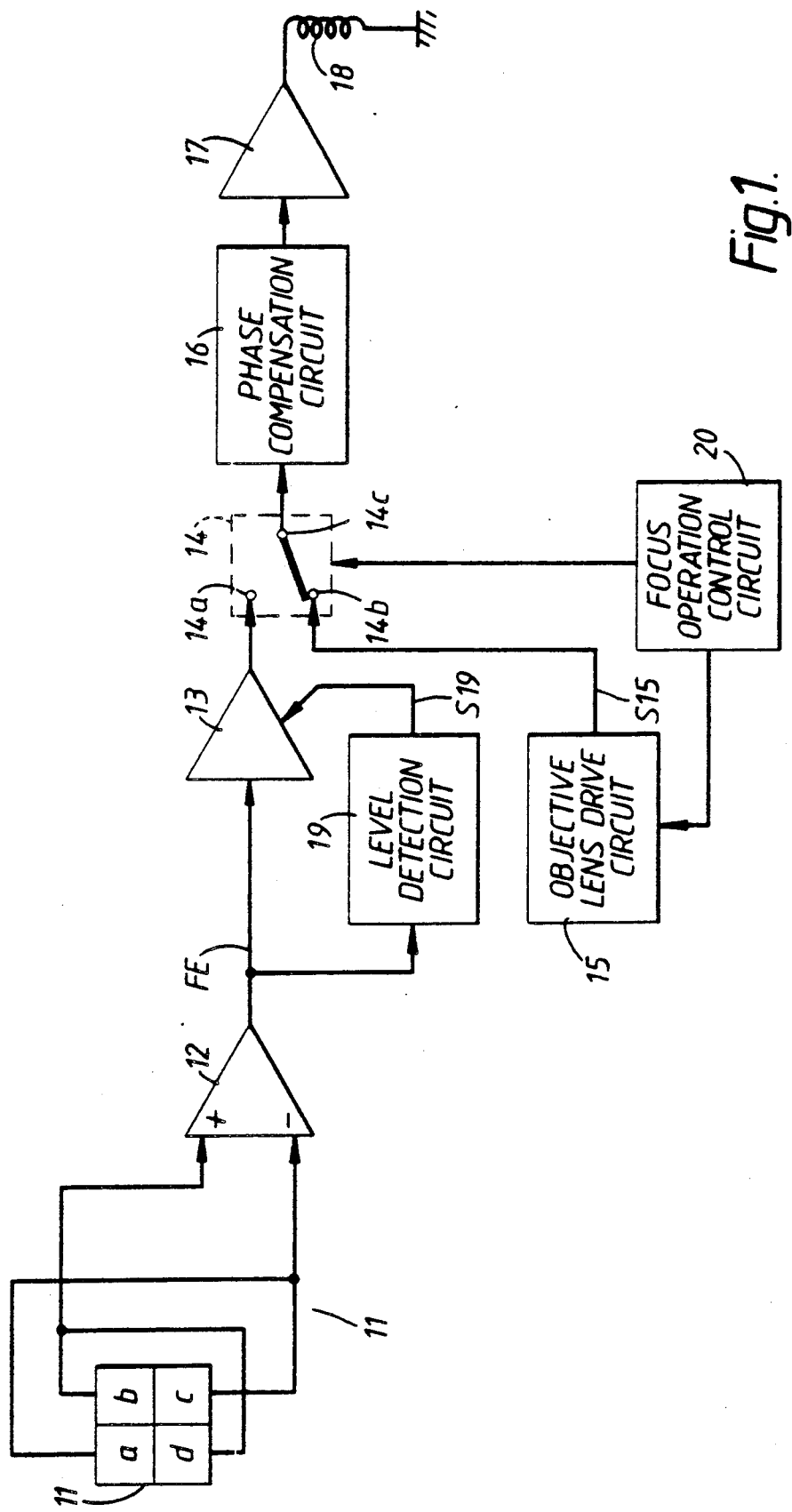
FIG. 1 is a block diagram showing an example of a conventional focus servo gain setting circuit for an optical record disc reproducing apparatus.

The present invention will be described in detail with reference to the FIGS. 3 to 6. Throughout the drawings, reference numerals or letters used in FIGS. 1 and 2 will be used to designate like or equivalent elements for simplicity Of explanation.

Figure 3:
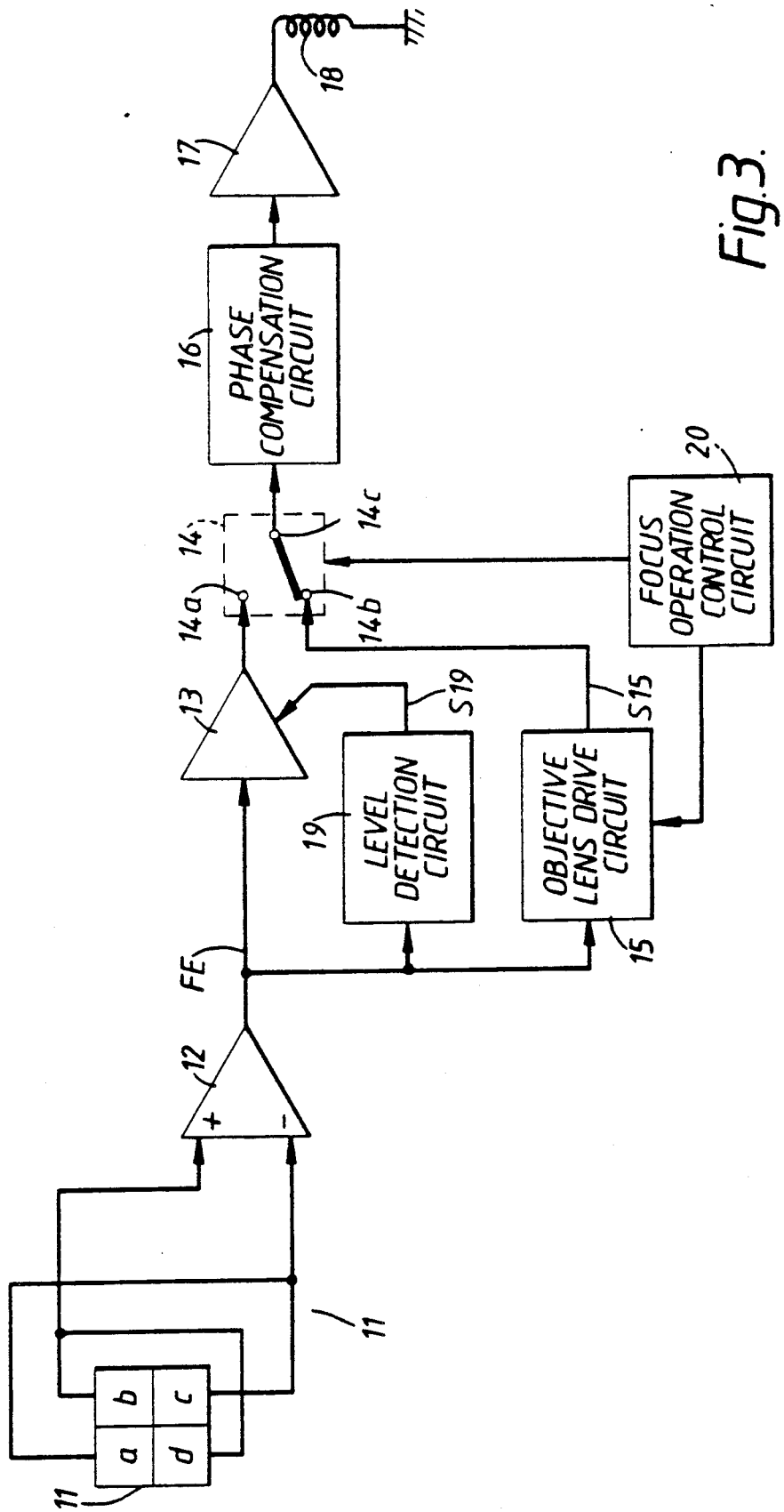
FIG. 3 is a block diagram of a first preferred embodiment of a focus servo gain setting circuit for optical record disc reproducing apparatus according to the present invention.

Referring now to FIG. 3, a first embodiment of the focus servo gain setting circuit for an optical record disc reproducing apparatus according to the present invention will be described in detail. In FIG. 3, parts which are not relevant to the control of the apparatus are omitted from the illustration.

Figure 2A:
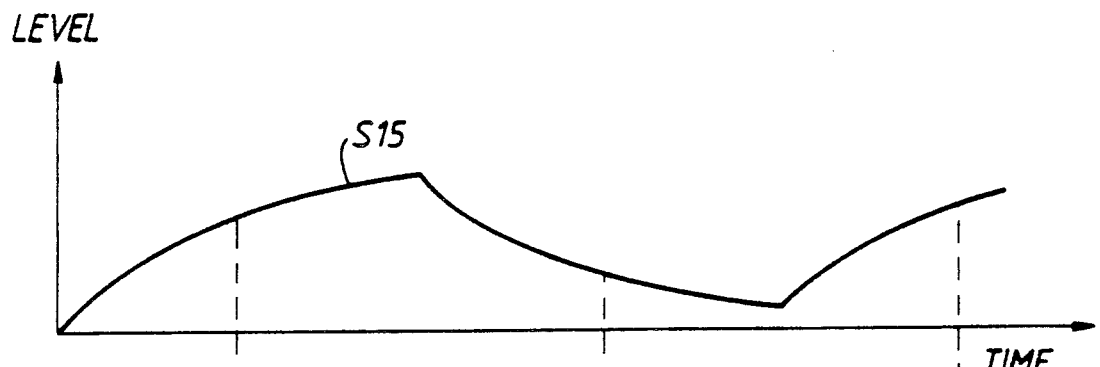
FIG. 2(a), 2(b) and 2(c) are timing diagrams showing various waveforms appearing in the circuit arrangement of FIG. 1, and the relative position of the optical focal point.
Figure 2B:
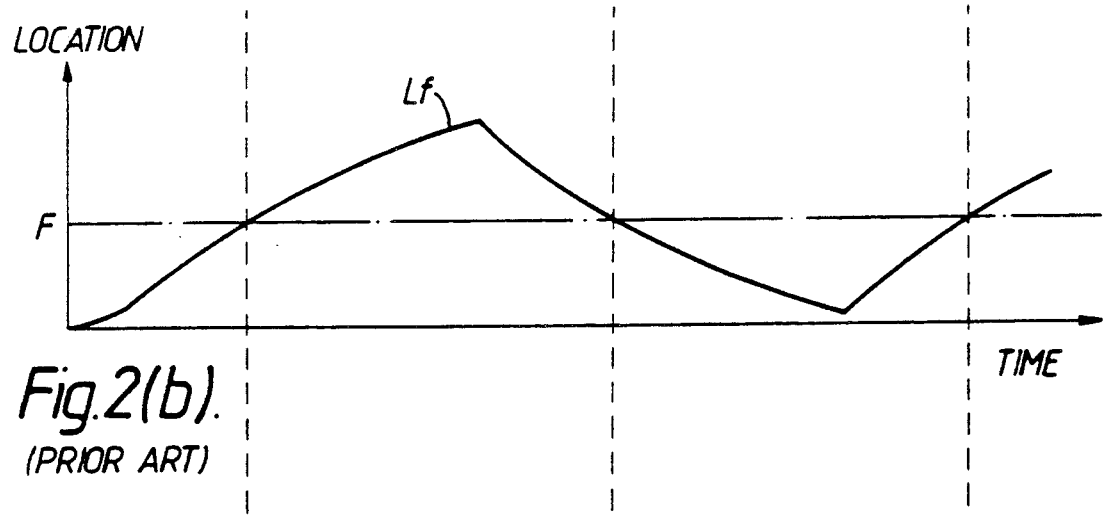
Figure 2C:
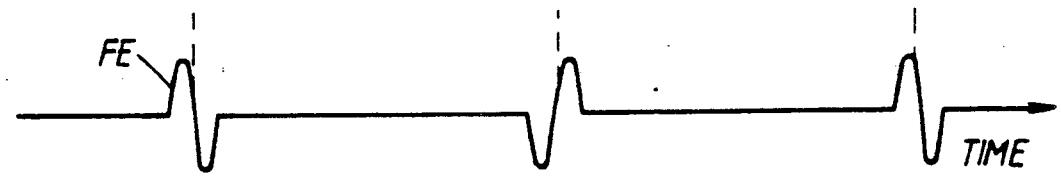

Optical pickup 11, which is conventional, comprises four photoelectric transducing elements 11a, 11b, 11c and 11d arranged diagonally to each other for separately detecting a reflected light beam, and a circuit for processing detected signals therefrom. The optical pickup 11 then generates three signals, an audio or video information carrying signal, i.e., so-called an RF (Radio Frequency; a very high frequency) signal, a tracking information carrying signal, i.e., a tracking error signal and a focusing information carrying error signal, i.e., a focusing error signal, through the processing circuits. However, for simplicity of explanation only a circuit 12 for generating the focusing error signal FE is shown in FIG. 1. The processing circuit 12 for the focusing error signal FE is constituted by a subtraction circuit.

Signals detected by two photoelectric transducing elements, e.g., 11a and 11c corresponding diagonally to each other are applied to an inversed phase input of the subtraction circuit 12. Other signals detected by two other photoelectric transducing elements, e.g., 11b and 11d corresponding diagonally to each other are applied to a non-inversed phase input of the subtraction circuit 12. Thus, the subtraction circuit 12 produces the focusing error signal FE. The focusing error signal FE is applied through a gain controllable amplifier 13 to a first input terminal 14a of a selector switch 14. The focusing error signal FE is further is applied to a level detection circuit 19. The level detection circuit 19 detects the level of the focusing error signal FE and applies its output, i.e., a level detection signal S19 to a control terminal of the gain controllable amplifier 13. Thus, the gain of the gain controllable amplifier 13 is controlled in accordance with the level of the focusing error signal FE. As a result, the focus servo gain of the focus servo system is automatically adjusted.

A second input terminal 14b of the selector switch 14 is coupled to an objective lens drive circuit 15. Selector switch 14 is coupled to and controlled by the focus operation control circuit 20. The objective lens drive circuit 15 has a pair of control terminals 15a and 15b. The first control terminal 15a is coupled to a focus operation control circuit 20, while the second control terminal 15b is coupled to the processing circuit 12 for receiving the focusing error signal FE.

An output terminal 14c of the selector switch 14 is coupled to a focus actuator 18, which is provided for moving an objective lens (not shown) in the direction perpendicular to an information carrying face of a disc, through a phase compensation circuit 16 and a drive amplifier 17. In the Figure, the focus actuator 18 is represented by a focus actuator coil.

Figure 4A:
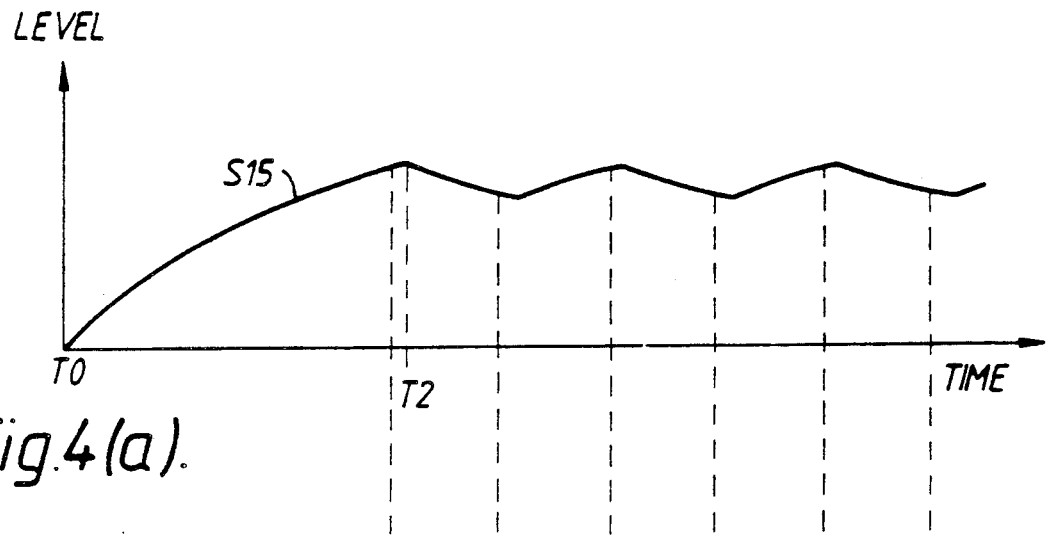
FIGS. 4(a), 4(b) and 4(c) are timing diagrams showing various waveforms appearing in the circuit arrangement of FIG. 3, and the relative position of the optical focal point.
Figure 4B:
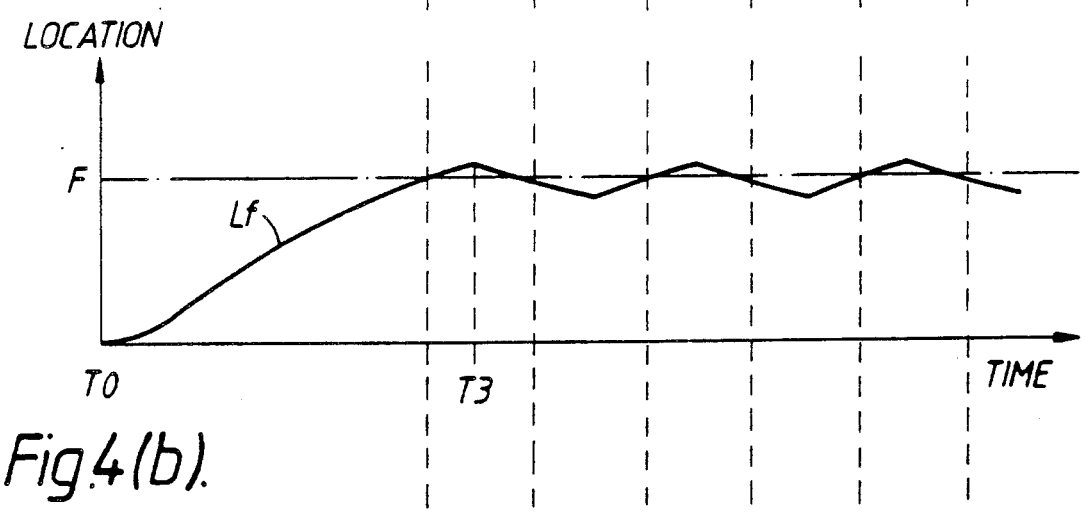
Figure 4C:
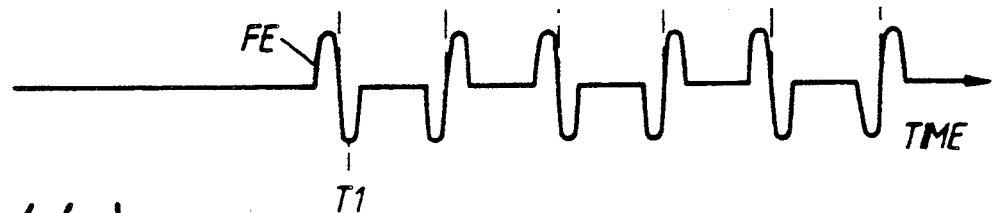

Referring now to FIGS. 4(a), 4(b) and 4(c), the operation of the first embodiment of the focus servo gain setting circuit for an optical record disc reproducing apparatus according to the present invention, as shown in FIG. 3, will be described in detail. The focus operation control circuit 20 controls the selector switch 14 to select the second input terminal 14b, when a disc reproducing operation is requested at a time T0. The focus operation control circuit 20 further controls the objective lens drive circuit 15, so that the circuit 15 generates a lens drive signal S15. The lens drive signal S15 first increases gradually until a time T2, as shown by waveform S15 in FIG. 4(a). The lens drive signal S15 increases gradually at a speed almost the same as the lens drive signal S15 of the conventional circuit (see FIG. 2(a)).

The lens drive signal S15 is applied to the focus actuator coil 18 through the selector switch 14, the phase compensating circuit 16 and the drive amplifier 17. The focus actuator coil 18 actuates the objective lens to move perpendicularly relative to the information carrying face of the optical record disc. As a result, a location Lf of the focal point of the light beam varies in response to the lens drive signal S15, In FIG. 4(b), a line F shows the location of the information carrying face. When the location Lf of the focal point of the light beam substantially coincides with the location F of the the information carrying face at a time T1, the optical pickup 11 generates the focusing error signal FE, as shown by signal FE in FIG. 4(c). The graph Lf in FIG. 4(b) shows the variation of the location Lf of the focal point from the information carrying face. The focusing error signal FE is applied to the objective lens drive circuit 15, as well as to the level detection circuit 19. The lens drive signal S15 of the objective lens drive circuit 15 reverses its polarity at the time T2 delayed a prescribed time from the time T1 in response to the focusing error signal FE. As a result, the direction of the movement of the objective lens is reversed at the time T3 a short time after the polarity change. The location Lf of the focal point quickly approaches the location F of the information carrying face. After that, the same operation is repeated. As a result, the lens drive signal S15 and the location Lf of the focal point alternate within a relatively short period of about 0.1 sec. or less, as shown in FIGS. 4(a) and 4(b).

The focusing error signals FE obtained through the oscillative movement of the objective lens are applied to the level detection circuit 19. The levels of the focusing error signals FE are detected by the level detection circuit 15 each time the focal point moves across the location F of the information carrying face. The output of the level detection circuit 19, i.e., the level detection signal S19 responsive to the focusing error signal FE is applied to the gain controllable amplifier 13, so that the gain of the gain controllable amplifier 13 is set to an adequate level. The gain setting of the gain controllable amplifier 13 is completed through several applications of the level detection signal S19, e.g., six times or more.

After completion of the gain setting, a focus search operation is performed in a conventional manner. After the focus search operation, the focus operation control circuit 20 controls the selector switch 14 to select the first input terminal 14a. As a result, the focusing error signal FE is applied to the focus actuator coil 18 in place of the lens drive signal S15 from the objective lens drive circuit 15. After that, the objective lens is controlled by the focusing error signal FE, so that the focus servo for the objective lens is controlled according to the focus servo gain previously set.

Therefore, the required number of focusing error signals FE for the gain setting operation are obtained in a very short time.

Referring now to FIGS. 5 and 6, descriptions will be made of a second preferred embodiment according to the present invention. The circuit arrangement shown in FIG. 5 is modified form that of FIG. 3, so that the objective lens drive circuit 15 is coupled to receive an RF signal obtained by the optical pickup 11. In FIG. 5, the optical pickup 11 includes an RF signal generating circuit 21 comprised of an adder circuit.

FIGS. 6(a), 6(b), 6(c) and 6(d) are graphs showing various waveforms appearing in the circuit arrangement of FIG. 5, and the relative position of the optical focal point, obtained in the gain setting operation. The graphs of FIGS. 6(a), 6(b) and 6(c) are equivalent to those of FIGS. 4(a), 4(b) and 4(c) in the first embodiment shown in FIG. 3. The signals obtained by the photoelectric transducing elements 11a and 11c are applied to an input of the adder circuit 21. The signals obtained by the photoelectric transducing elements 11b and 11d are applied to another input of the adder circuit 21. Thus, the RF signal, as shown in FIG. 6(d), is obtained as the sum of all signals obtained by the four diagonally arranged photoelectric transducing elements 11a to 11d. The RF signal also is generated simultaneously with the focus error signals FE in the gain setting operation. Thus, the circuit of FIG. 5 also performs an operation equivalent to the circuit of FIG. 3.

As described above, the present invention can provide an extremely preferably focus servo gain setting circuit for an optical record disc reproducing apparatus.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A focus servo gain setting circuit for an optical record disc reproducing apparatus including a gain controllable amplifier and means for generating a laser light beam for reading information data stored on said optical record disc, comprising:

lens drive circuit means for generating a lens drive signal having a predetermined polarity;
    optical pickup means for detecting said information data stored on said optical disc and generating data signals corresponding thereto, said optical pickup mans including a movable lens having a prescribed focal point and being responsive to said lens drive signal for moving said focal point, and focus circuit means for generating focus error pulse signals in response to movement of said focal point;
    means responsive to said focus error pulse signals for reversing said predetermined polarity of said lens drive signal to increase the output rate of said focus error pulse signals from said focus circuit means; and
    means responsive to a predetermined plurality of said focus error pulse signals for adjusting the gain of said gain controllable amplifier.

2. A focus servo gain setting circuit according to claim 1, further comprising focus control circuit means for controlling said lens drive circuit means, and means responsive to said focus control circuit means for stopping the gain adjustment of said gain controllable amplifier after said predetermined plurality of focus error pulse signals have been generated by said focus circuit means.

3. A focus servo gain setting circuit according to claim 2 wherein said focus circuit means includes a subtraction circuit.

4. A focus servo gain setting circuit according to claim 3, wherein said optical pickup means includes focus actuator means for enabling bidirectional movement of said movable lens substantially perpendicular to said optical record disc.

5. A focus servo gain setting circuit according to claim 1, wherein said means for reversing said predetermined polarity of said lens drive signal includes RF signal means for supplying said data signals to said lens drive circuit means.

6. A focus servo gain setting circuit according to claim 1, wherein said means for reversing said predetermined polarity of said lens drive signal includes means for supplying said focus error pulse signals to said lens drive circuit means.

7. A focus servo gain setting circuit for an optical disc reproducing apparatus, comprising:

gain controllable amplifier means;
    lens means having a prescribed focal point and means for scanning said focal point bidirectionably across an optical disc;
    means for generating a lens drive signal having a predetermined polarity;
    means for supplying said lens drive signal to said lens means so as to scan said focal point in a first direction across said optical disc;
    means for outputting a first focusing error signal when aid focal point substantially coincides with a predetermined location on said optical disc;
    means responsive to said first focusing error signal for reversing said predetermined polarity of said lens drive signal such that said focal point is scanned in a second direction across said optical disc, said second direction being opposite to said first direction; and
    means for outputting a second focusing error signal when said focal point substantially coincides with said predetermined location on said optical disc, wherein said gain controllable amplifier means is responsive to said first and second focusing error signals for adjusting the gain thereof.

8. A method of controlling a focus servo gain setting circuit for an optical disc reproducing apparatus, including a gain controllable amplifier, a movable lens having a prescribed focal point which is scanned across an optical disc, and a focusing error signal circuit for generating a focusing error signal each time said focal point substantially coincides with a predetermined location on said optical disc, comprising the steps of:

a) generating a lens driving signal having a predetermined polarity;

b) supplying said lens driving signal to said movable lens to scan said focal point in a first direction across said optical disc;

c) generating a focusing error signal when said focal point substantially coincides with said predetermined location on said optical disc;

d) reversing said predetermined polarity of said lens driving signal in response to said focusing error signal;

e) supplying said reversed polarity lens driving signal to said movable lens to scan said focal point in a second direction, opposite to said first direction, across said optical disc; and f) generating a second focusing error signal when said focal point substantially coincides with said predetermined location on said optical disc.

9. A method according to claim 8, further comprising the step of repeating steps d)-f) so as to generate a plurality of focusing error signals.

10. A method according to claim 9, further comprising the step of supplying said plurality of focusing error signals to said gain controllable amplifier to set the gain thereof.

* * * * *

UNITED STATES PATENT AND TRADEMARK OFFICE
CERTIFICATE OF CORRECTION

PATENT NO. : 5,124,964
DATED : June 23, 1992
INVENTOR(S) : Yasuhiro Hayashi It is certified that error appears in the above-identified patent and that said Letters Patent is hereby corrected as shown below:

Claim 1, column 7, line 68, change "mans" to --means--.

Claim 3, column 8, line 22, change "2" to --2,--.

Claim 7, column 8, line 51, change "aid" to --said--.

Signed and Sealed this

Ninth Day of November, 1993

*Attest:*

BRUCE LEHMAN

*Attesting Officer*     *Commissioner of Patents and Trademarks*